Figure 1:
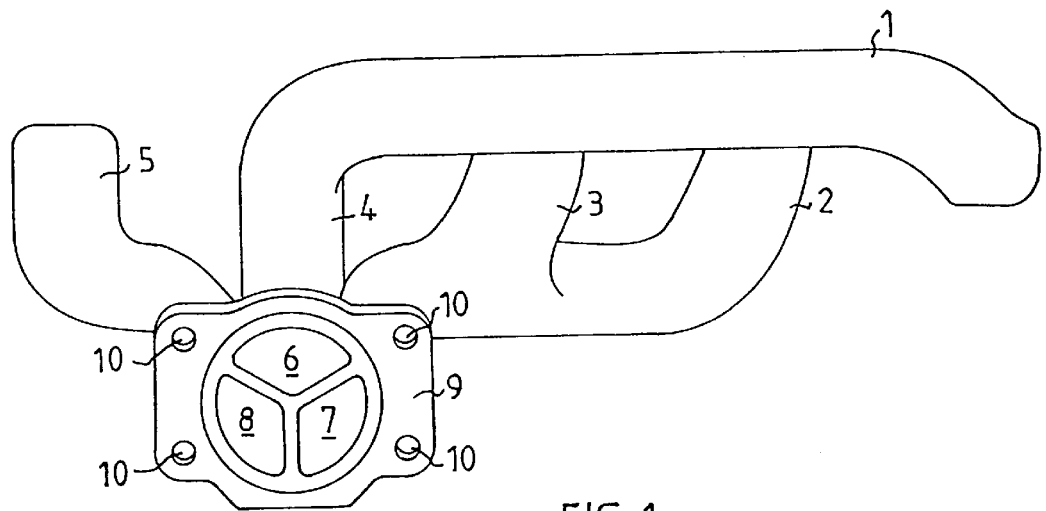

United States Patent

Zander et al.

[11] Patent Number: 6,062,024
[45] Date of Patent: May 16, 2000

[54] MANIFOLD FOR A TURBO-CHARGED INTERNAL COMBUSTION ENGINE

[75] Inventors: Lennarth Zander, Mölndal; Ingemar Martinsson, Hisings Backa; Jan Erling Rydquist, Kullavik, all of Sweden

[73] Assignee: AB Volvo, Gothenburg, Sweden

[21] Appl. No.: 09/051,430

[22] PCT Filed: Oct. 9, 1996

[86] PCT No.: PCT/SE96/01284

§ 371 Date: Apr. 9, 1998

§ 102(e) Date: Apr. 9, 1998

[87] PCT Pub. No.: WO97/13965

PCT Pub. Date: Apr. 17, 1997

[30] Foreign Application Priority Data

Oct. 10, 1995 [SE] Sweden ................................. 9503526

[51] Int. Cl.⁷ .................................................. F02B 37/00
[52] U.S. Cl. ................................................. 60/597; 60/323
[58] Field of Search ................................ 60/597, 605.1, 60/323

[56] References Cited

U.S. PATENT DOCUMENTS

| 1,910,279 | 5/1933 | Buchi | 60/605.1 |
| 3,948,052 | 4/1976 | Merkle et al. | |
| 4,207,742 | 6/1980 | Dommes et al. | |
| 4,294,073 | 10/1981 | Neff | 60/597 |

FOREIGN PATENT DOCUMENTS

| 423539 | 2/1935 | United Kingdom | 60/597 |
| 2 060 066 | 4/1981 | United Kingdom . | |

*Primary Examiner*—Michael Koczo
*Attorney, Agent, or Firm*—Young & Thompson

[57] ABSTRACT

An exhaust manifold and a turbine housing for a turbo-charged five-cylinder engine are cast as a single piece. This arrangement renders unnecessary a flanged connection between a separate exhaust manifold and turbine housing. The one-piece design provides optimum gas paths to obtain a good response.

2 Claims, 1 Drawing Sheet

MANIFOLD FOR A TURBO-CHARGED INTERNAL COMBUSTION ENGINE

The present invention relates to cast exhaust manifold with turbine housing for a turbocharged five-cylinder internal combustion engine, comprising first, second, third and fourth exhaust branch conduits, which converge in pairs with an outlet for each pair leading into an inlet to the turbine housing, and a fifth exhaust branch conduit with its own outlet leading into the turbine housing.

A five-cylinder engine places greater demands on the design of the exhaust manifold than does, for example, a four-cylinder engine due to the fact that the overlap between the exhaust valves in the open position is greater than in the four-cylinder engine and thus the risk that the cylinders will disrupt each other in gas exhange is greater. Dividing the exhaust conduits in the above described way provides a three pulse charging which prevents the cylinders from disrupting each other during gas exchange.

In hitherto known turbine-housing-equipped manifolds of this type, the three outlets converge into a flange portion with holes for mounting screws. The turbine housing is equipped with a corresponding holed flange portion which is screwed, with a gasket therebetween, to the flange portion of the manifold. The problem is, however, that it is difficult with such an exhaust manifold to provide a design which combines optimum gas paths with the requirement of placing the turbine close to the engine to obtain a good response.

The purpose of the present invention is to achieve an exhaust manifold of the type described by way of introduction which makes possible better flow and response than hitherto possible in a five-cylinder engine.

This is achieved according to the invention by virtue of the fact that the turbine housing is cast in one piece with the exhaust manifold. This eliminates the flanged connection between the exhaust manifold and the turbine housing, which, with the same placement of the turbine relative to the engine as in a previously known engine installation, provides greater radii for the curves in the manifold conduits and placement of the triple outlet closer to the turbine rotor. The result will be increased energy delivery to the turbo unit and better response. The pressure losses in the turbo unit will be less and the pressure level on the exhaust side will be reduced, which reduces the pump losses and increases the efficiency of the engine. Finally, a potential source of leakage is eliminated.

Figure 2:
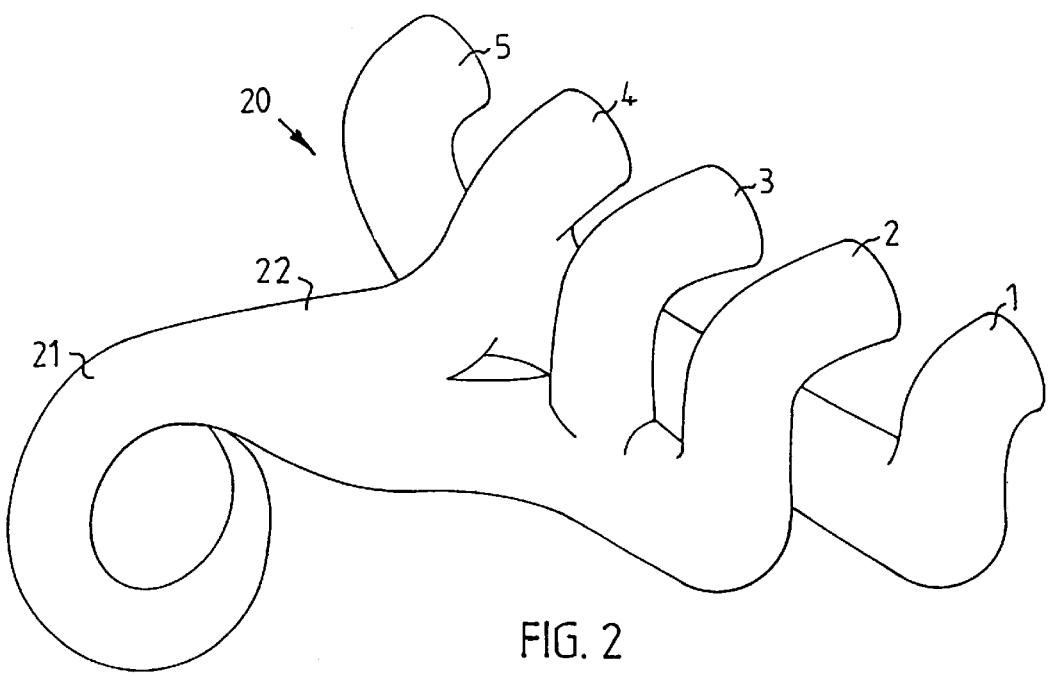

The invention will be described in more detail below with reference to an example shown in the accompanying drawing, where FIG. 1 shows a schematic perspective view of a previously known exhaust manifold for a five-cylinder engine, and FIG. 2 shows a schematic perspective view of one embodiment of an exhaust manifold according to the invention for a similar engine.

The manifold shown in FIG. 1 comprises five branches 1–5 intended to be coupled to exhaust outlets on a five-cylinder engine. The branches 1 and 4 converge into a common outlet 6, the branches 2 and 3 into a common outlet 7 and the branch 5 has its own outlet 8. The outlets 6, 7 and 8 are localized in a mounting flange 9 which has four holes 10. A turbine housing (not shown) with a corresponding mounting flange is intended to be screwed securely to the flange 9 with a gasket therebetween.

Numeral 20 in FIG. 2 generally designates a manifold according to the invention, which differs from that shown in FIG. 1 primarily in that it is cast in one piece with an exhaust turbine housing 21 containing a turbine (not shown) designed to drive a compressor for compressing engine intake air. In FIG. 2, the parts having direct counterparts in FIG. 1 have been given the same reference numerals as in FIG. 1. Outlets corresponding to the three outlets 6, 7 and 8 are located in the wider transition between the converged branches 1–5 and the turbine housing 22 and can, due to the absence of the flanged joint, be moved closer to the turbine than in the known design. This provides turbodynamic advantages in the form of reduced wave transmissions between the cylinders and better wave transmission to the turbine. As can be seen in FIG. 2, the straight portion of the branch 1 extends under the branches 2 and 3, which thereby have bends of greater radius than in the known design shown in FIG. 1. This improves the gas exchange.

What is claimed is:

1. A cast exhaust manifold with turbine housing for a turbo-charged five-cylinder internal combustion engine, comprising first, second, third, and fourth exhaust branch conduits, which converge in pairs with an outlet for each pair leading into an inlet to the turbine housing, and a fifth exhaust branch conduit with its own outlet leading into the turbine housing, wherein the turbine housing is cast in one piece with an entirety of the exhaust manifold.

2. Cast exhaust manifold with turbine housing for a turbo-charged five-cylinder internal combustion engine, comprising first, second, third and fourth sequential exhaust branch conduits (1–4), which converge in pairs with an outlet (6,7) for each pair leading into an inlet to the turbine housing, and a fifth sequential exhaust branch conduit (5) with its own outlet (8) leading into the turbine housing, wherein the turbine housing (21) is cast in one piece with the exhaust manifold (20); and wherein the first branch conduit (1) converges with the fourth branch conduit (4) and the second branch conduit (2) converges with the third branch conduit (3), and that the two last mentioned branch conduits extend over the first branch conduit.

* * * * *